United States Patent
Abrahamsson

[11] Patent Number: 6,135,021
[45] Date of Patent: Oct. 24, 2000

[54] NUTCRACKER

[76] Inventor: Clas Abrahamsson, Stjärnvik Slotts Flygeln, Finspång, SE-612 92, Sweden

[21] Appl. No.: 09/407,567

[22] Filed: Sep. 28, 1999

[51] Int. Cl.⁷ .................................. A23N 5/00; A23N 5/02
[52] U.S. Cl. .................................. 99/571; 99/572; 99/577; 99/579; 99/581
[58] Field of Search .......................... 99/568–583, 600, 99/537–539, 584, 617, 618; 30/120.1, 120.2; 100/158; 241/6.7, 252; 426/481, 482

[56] References Cited

U.S. PATENT DOCUMENTS

| | | | |
|---|---|---|---|
| D. 298,099 | 10/1988 | Luc | D7/98 |
| 2,812,793 | 11/1957 | Ford | 99/582 |
| 3,159,194 | 12/1964 | Anderson | 99/578 |
| 3,435,863 | 4/1969 | Dye | 99/583 |
| 3,713,468 | 1/1973 | Walsh | 99/580 |
| 3,841,212 | 10/1974 | Powell | 99/571 |
| 4,377,970 | 3/1983 | Kenkel | 99/571 |
| 4,438,687 | 3/1984 | McNiel | 99/571 |
| 4,603,624 | 8/1986 | Greenblatt | 99/572 |
| 4,665,814 | 5/1987 | Harborne et al. | 99/579 X |
| 5,092,231 | 3/1992 | Smith | 30/120.2 X |
| 5,505,123 | 4/1996 | Kim | 99/579 |
| 5,711,213 | 1/1998 | Thomson | 99/571 |

FOREIGN PATENT DOCUMENTS

| | | |
|---|---|---|
| 0 667 112 A1 | 8/1995 | European Pat. Off. . |
| 1 003 433 | 3/1952 | France . |
| 3002242 | 7/1981 | Germany . |

*Primary Examiner*—Timothy Simone
*Attorney, Agent, or Firm*—Zarley, McKee, Thomte, Voorhees & Sease

[57] ABSTRACT

A nutcracker comprising an anvil, an impact member, the anvil and the impact member being arranged to receive a nut therebetween for cracking, a striking member, and a guiding device for guiding the impact member in a movement towards and away from said anvil and for guiding the striking member in a movement towards and away from said impact member, wherein the striking member is arranged to be forced by its own weight against the impact member under the attraction of gravity so as to impart a cracking force to the shell of a nut received between said impact member and said anvil.

13 Claims, 1 Drawing Sheet

NUTCRACKER

FIELD OF THE INVENTION

The present invention relates to a nutcracker of the type in which the nut to be cracked is disposed between an anvil and an impact member.

BACKGROUND OF THE INVENTION

There are several types of nutcrackers available on the market, most of which have is the form a pair of tongs or the like. A practical drawback with these types of nutcrackers is the large risk for shell fragments being thrown out onto tables or floors. Another drawback is that a rather large manual power is required by the operator for cracking a hard and/or large nut. A number of nutcrackers have been suggested for overcoming said drawbacks. These suggested nutcrackers, however, normally have a complex construction and are costly to manufacture. Furthermore, many of the available nutcrackers do not possess any ornamental value and are put away after having been used.

OBJECT OF THE INVENTION

An object of the present invention is to provide a novel nutcracker, which is easy to operate and can be used for cracking even hard-shell nuts without requiring any larger manual power being exerted by the operator, and which has a simple construction making it possible to manufacture the nutcracker at low costs.

A further object of the present invention is to provide a nutcracker, which can be given an appealing design by use of suitable manufacturing materials, and which, when being in an operative position, can be kept in a room as an ornament.

Still a further object of the present invention is to provide a nutcracker, where the shell fragments are prevented from being thrown into the surroundings when a nut is being cracked.

SUMMARY OF THE INVENTION

The nutcracker according to the invention comprises an anvil, an impact member, the anvil and the impact member being arranged to receive a nut therebetween for cracking, a striking member, and a guiding device for guiding the impact member in a movement towards and away from said anvil and for guiding the striking member in a movement towards and away from said impact member, wherein the striking member is arranged to be forced by its own weight against the impact member under the attraction of gravity so as to impart a cracking force to the shell of a nut held between said impact member and said anvil. With this nutcracker, the operator only has to lift and subsequently drop the striking member in order to effect the cracking of a nut. Therefore, the cracking operation does not require any large manual power being exerted by the operator. Furthermore, the cracking force is obtained in a very simple manner and without the use of any complex mechanisms.

According to a preferred embodiment of the invention, the means for guiding the striking member comprises a first slide bar mounted in the upper part of the impact member and extending in an essentially vertical direction from said impact member, said striking member being provided with a channel which is adapted to receive said slide bar. Hereby, a particularly effective and simple guiding of the striking member is achieved.

According to another preferred embodiment of the invention, the means for guiding the impact member comprises a sleeve inside of which said impact member is slidably arranged, said sleeve being arranged to bear against the anvil when a nut held between said anvil and said impact member is to be cracked, the sleeve thereby enclosing the space between the anvil and the impact member. In this way, one and the same member can be used for guiding the impact member and for preventing shell fragments from being thrown into the surroundings when a nut is cracked. Said sleeve also prevents personal injuries during the nut cracking operation.

According to a further preferred embodiment of the invention, said sleeve is guided by a second guiding device in a linear movement towards and away from and a turning movement in relation to said anvil, said impact member being provided with a collar extending from the side of the impact member at a position above said sleeve, whereby the sleeve when being lifted imparts a lifting force to the impact member via said collar. Hereby, the impact member can easily be moved away from the anvil for removal of a cracked nut and/or for insertion of a new nut to be cracked.

According to a further preferred embodiment of the invention, said second guiding device comprises a second slide bar mounted to a base plate and extending from the base plate in an essentially vertical direction in parallel with said first slide bar, the anvil being arranged inside a bowl which is placed on said base plate. Since the whole nutcracker is arranged on a base plate, it can easily be moved around by lifting and moving the base plate. Said base plate can for instance form part of a table, if so desired. Shell fragments from cracked nuts are being collected in the bowl, and are thereby prevented from littering the surroundings.

BRIEF DESCRIPTION OF THE DRAWING

In the following, a preferred embodiment of the invention will, as an illustrating example, be described in more detail with reference to the accompanying drawing, in which.

DESCRIPTION OF PREFERRED EMBODIMENT

Figure 1:
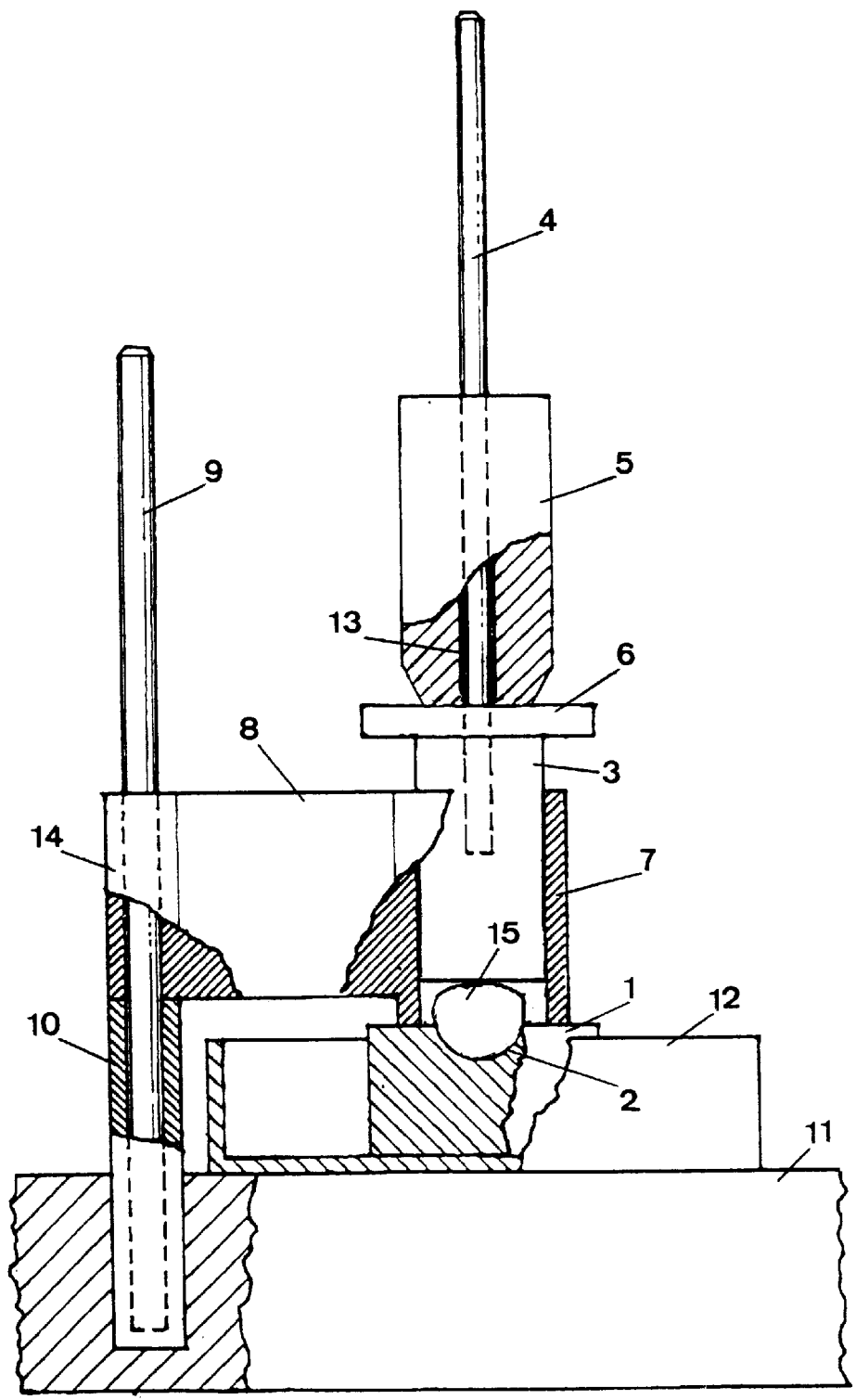
FIG. 1 is a, partially cut, schematic side view of a nutcracker according to the invention.

The nutcracker shown in the drawing comprises an anvil 1 having a recess 2 for reception of a nut to be cracked. The recess could be terraced or several recesses of different size could be provided, so as to suit nuts of various sizes. Instead of a recess, the anvil could be provided with any type of member suitable for supporting a nut to be cracked, such as a bowl-like member or the like. The nut to be cracked could also be placed directly onto a flat upper surface of the anvil 1. The anvil 1 rests on the bottom of a bowl 12, which bowl is placed on top of a base plate 11. An impact member 3 is slidably arranged inside a cylindrical first sleeve 7 above the anvil 1. Said sleeve 7 guides the impact member in a vertical movement towards and away from the anvil 1. A collar 6 is provided at the upper part of the impact member 3, which collar 6 has a larger diameter than the impact member 3 and consequently also a larger diameter than the internal diameter of the sleeve 7. An elongated first slide bar 4 is vertically extending from the upper part of the impact member 3, and a striking member 5 is slidably mounted on said slide bar 4 via a channel 13 formed to centrally in and passing through said striking member 5. Said first sleeve 7 is connected to a second sleeve 14 via a supporting arm 8, said second sleeve 14 being slidably and pivotably mounted on a second slide bar 9. Said second slide bar 9 extends in a vertical direction from the base plate 11 in parallel with the first slide bar 4. The second sleeve 14 constitutes a holding and guiding member for the first sleeve 7. In its lower position, the second slide bar 14 bears against a third sleeve 10, which surrounding the second slide bar 9 is fixed to the base plate 11. The second slide bar 9 could also be provided with a bottom part having a larger diameter than the internal diameter of the second sleeve 14 and consequently also a larger diameter than the upper part of said slide bar, in which case said third sleeve 10 could be omitted.

When a nut is to be cracked, an operator by hand lifts the impact member 3 by means of the first sleeve 7, either by lifting said sleeve 7 directly or by lifting it via the supporting arm 8. In this lifting movement, the first sleeve 7 and the impact member 3 is vertically guided along the second slide bar 9 via the second sleeve 14. This lifting movement of the impact member 3 could, if so desired, be combined with a pivoting movement around said second slide bar 9. When the impact member 3 has been moved away so as to give access to the nut receiving recess 2 of the anvil 1, a nut 15 is placed in said recess 2, whereupon the impact member 3 is moved back and placed on top of the nut 15 and the first sleeve 7 is moved downwards until it rests against the upper side of the anvil 1. The nut 15 is now received between the anvil 1 and the impact member 3, the first sleeve 7 enclosing the space between the anvil 1 and the impact member 3. Thereafter, the operator by hand lifts the striking member 5 in a vertical movement along the first slide bar 4. When the striking member 5 has reached a suitable height, the operator releases the striking member 5, whereupon the striking member 5 by its own weight falls against the impact member under the attraction of gravity. If so desired, the striking member can be given an additional striking velocity by means of hand power, in that the striking member is thrown towards the impact member by a downwardly sweeping movement of the hand holding the striking member before said hand releases the striking member. When the striking member 5 hits the impact member 3, a cracking force is imparted to the shell of the nut 15 held between said impact member and the anvil 1. The sleeve 7 enclosing the space between the impact member 3 and the anvil 1 prevents nut fragments from being thrown into the surroundings.

The means for guiding the impact member could as well comprise one or more vertical guiding bars adapted to be received inside vertical channels or apertures of the impact member. In this case, said vertical guiding bars could also be used for guiding the striking member. The striking member would then be provided with channels or apertures directed along the same axis as the channels or apertures of the impact member, the channel or apertures of the striking member being adapted to receive said vertical guiding bars.

While various changes may be made in the detail construction, it is understood that such change will be within the spirit and scope of the present invention, as defined by the appended claims.

What is claimed is:

1. A nutcracker comprising an anvil, an impact member, the anvil and the impact member being arranged to receive a nut therebetween for cracking, a striking member, and a guiding device for guiding the impact member in a movement towards and away from said anvil and for guiding the striking member in a movement towards and away from said impact member, wherein the striking member is arranged to be forced by its own weight against the impact member under the attraction of gravity so as to impart a cracking force to the shell of a nut received between said impact member and said anvil.

2. A nutcracker as defined in claim 1, wherein said guiding device comprises first guiding means for guiding the impact member in a movement towards and away from said anvil, and second guiding means for guiding the striking member in a movement towards and away from said impact member.

3. A nutcracker as defined in claim 2, wherein said second guiding means comprises a first slide bar mounted in the upper part of said impact member and extending in an essentially vertical direction from the impact member, said striking member being provided with a channel which is adapted to receive said slide bar.

4. A nutcracker as defined in claim 2, wherein said first guiding means comprises a sleeve, which is adapted to receive the impact member, said impact member being slidable inside said sleeve.

5. A nutcracker as defined in claim 4, wherein said sleeve is arranged to bear against said anvil when a nut received between the anvil and the impact member is to be cracked, the sleeve thereby enclosing the space between the anvil and the impact member.

6. A nutcracker as defined in claim 4, wherein said sleeve is guided by a second guiding device in a linear movement towards and away from said anvil.

7. A nutcracker as defined in claim 6, wherein said impact member is provided with a collar extending from the side of the impact member at a position above said sleeve, whereby the sleeve when being lifted imparts a lifting force to the impact member via said collar.

8. A nutcracker as defined in claim 7, wherein said sleeve is also guided by said second guiding device in a turning movement in relation to said anvil.

9. A nutcracker as defined in claim 8, wherein said second guiding device comprises a holding member which is slidably and pivotably mounted on a second slide bar.

10. A nutcracker as defined in claim 9, wherein said holding member consists of a second sleeve, within which said second slide bar is received.

11. A nutcracker as defined in claim 10, wherein said second sleeve is connected to said first sleeve via a supporting arm.

12. A nutcracker as defined in claim 9, wherein said second slide bar is mounted on a base plate and extends from the base plate in an essentially vertical direction in parallel with said first slide bar.

13. A nutcracker as defined in claim 12, wherein said anvil is arranged inside a bowl, which bowl is placed on said base plate.

* * * * *